(12) United States Patent
Ivakitch et al.

(10) Patent No.: US 9,140,125 B2
(45) Date of Patent: Sep. 22, 2015

(54) SEGMENTED RINGS WITH CAPTIVE NUTS FOR FAN BOLTS

(75) Inventors: Richard Ivakitch, Toronto (CA); Andreas Eleftheriou, Woodbridge (CA)

(73) Assignee: PRATT & WHITNEY CANADA CORP., Longueuil, Quebec (CA)

(*) Notice: Subject to any disclaimer, the term of this patent is extended or adjusted under 35 U.S.C. 154(b) by 848 days.

(21) Appl. No.: 13/364,411

(22) Filed: Feb. 2, 2012

(65) Prior Publication Data

US 2013/0202440 A1  Aug. 8, 2013

(51) Int. Cl.
*F01D 5/30* (2006.01)
*F01D 5/02* (2006.01)
*F16B 37/06* (2006.01)

(52) U.S. Cl.
CPC ............ *F01D 5/025* (2013.01); *F05D 2240/40* (2013.01); *F16B 37/068* (2013.01); *Y10T 29/49948* (2015.01)

(58) Field of Classification Search
CPC . F01D 5/025; F05D 2240/058; F16B 37/068; F04D 29/20; F04D 29/263; F04D 29/266
USPC ........................ 403/258, 262; 415/119, 214.1; 416/204 R, 122, 144, 500
See application file for complete search history.

(56) References Cited

U.S. PATENT DOCUMENTS

| | | | |
|---|---|---|---|
| 1,492,561 A | | 5/1924 | Gabriel |
| 1,645,323 A | * | 10/1927 | Griswold ..................... 74/570.1 |
| 1,662,441 A | | 3/1928 | Sexton |
| 2,420,921 A | | 5/1947 | Waldes |
| 2,476,586 A | | 7/1949 | Darash |
| 2,547,263 A | | 4/1951 | Heimann et al. |
| 2,999,412 A | | 9/1961 | Martens |
| 3,162,084 A | | 12/1964 | Wurzel |
| 3,464,307 A | | 9/1969 | Wurzel |
| 5,106,252 A | | 4/1992 | Shapton |
| 5,222,360 A | * | 6/1993 | Antuna et al. ............... 60/226.1 |
| 5,509,780 A | | 4/1996 | Synfelt |
| 6,931,861 B2 | * | 8/2005 | Wagner .......................... 60/796 |
| 7,204,668 B2 | | 4/2007 | Le |
| 7,303,377 B2 | * | 12/2007 | Rockarts et al. ............. 416/144 |
| 7,458,773 B2 | * | 12/2008 | Brault et al. ............... 415/216.1 |
| 2013/0011253 A1 | * | 1/2013 | Mulcaire .................... 415/214.1 |

* cited by examiner

*Primary Examiner* — Nathaniel Wiehe
*Assistant Examiner* — Woody A Lee, Jr.
(74) *Attorney, Agent, or Firm* — Norton Rose Fulbright Canada LLP

(57) ABSTRACT

An apparatus and method for connecting a fan rotor to a shaft of a gas turbine engine includes a segmented clinch nut plate having a plurality of clinch nuts installed in pre-drilled holes in each segment. A plurality of mounting bolts extending through the holes in the rotor shaft and holes in a mounting device of the shaft threadedly engage the clinch nuts of the clinch nut plate. The segments of the clinch nut plate are disposed separately one from another.

10 Claims, 3 Drawing Sheets

SEGMENTED RINGS WITH CAPTIVE NUTS FOR FAN BOLTS

TECHNICAL FIELD

The described subject matter relates generally to gas turbine engines, and more particularly, to a joint apparatus for connecting a fan rotor to a shaft of a gas turbine engine.

BACKGROUND OF THE ART

Aircraft gas turbine engines generally include a low pressure spool assembly having a fan rotor, low pressure compressor and a low pressure turbine connected by a low pressure spool shaft, and a high pressure spool assembly having a high pressure compressor and a high pressure turbine connected by a hollow high pressure spool shaft disposed coaxially around the low pressure spool shaft. Conventionally, the fan rotor is connected to the low pressure spool shaft by a plurality of mounting bolts engaged with nuts, which may be pre-installed in respective mounting holes drilled in the low pressure spool shaft, such as in a conventional application of clinch nuts. Replacement of the clinch nuts during a maintenance service, involves drilling out the clinch nuts in order to remove them from the low pressure spool shaft and then re-rolling or flaring new clinch nuts in the holes of the low pressure spool shaft. Both operations could potentially damage the low pressure spool shaft which is an important and expensive component of the gas turbine engine.

Accordingly, there is a need to provide an improved joint apparatus for connecting the fan rotor to the low pressure spool shaft of aircraft gas turbine engines.

SUMMARY

In one aspect, the described subject matter provides a gas turbine engine having at least one spool assembly including a fan rotor and a turbine rotor connected by a shaft, the at least one spool assembly further including a joint apparatus, the joint apparatus comprising a mounting device of the shaft and a clinch nut plate in a form of a ring, the mounting device of the shaft defining a plurality of mounting holes circumferentially spaced apart one from another, the clinch nut plate including a plurality of holes circumferentially spaced apart one from another and a plurality of clinch nuts installed in the respective holes in the clinch nut plate, a plurality of mounting bolts axially extending through respective mounting holes of the fan rotor and further passing through the mounting holes in the mounting device of the shaft, the mounting bolts threadingly engaging the respective clinch nuts to clamp the mounting device of the shaft between the fan rotor and the clinch nut plate, the clinch nut plate including a plurality of circumferential segments physically separate one from another.

In another aspect, the described subject matter provides a method for connecting a fan rotor to a shaft of a gas turbine engine, the method comprising: a) providing a clinch nut plate in a ring form including a plurality of holes circumferentially spaced apart one from another and a plurality of clinch nuts installed in the respective holes in the clinch nut plate, the clinch nut plate including two or more separate circumferential segments; and b) inserting a plurality of mounting bolts through respective holes in the fan rotor and holes of a mounting device of the shaft to threadingly engage with the respective clinch nuts of the segments of the clinch nut plate in order to clamp the flange of the shaft between the fan rotor and the clinch nut plate, the segments of the clinch nut plate being disposed separately one from another to reduce shear loads acting on the mounting bolts.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which.

It will be noted that throughout the appended drawings, like features are identified by like reference numerals.

DETAILED DESCRIPTION

Figure 1:
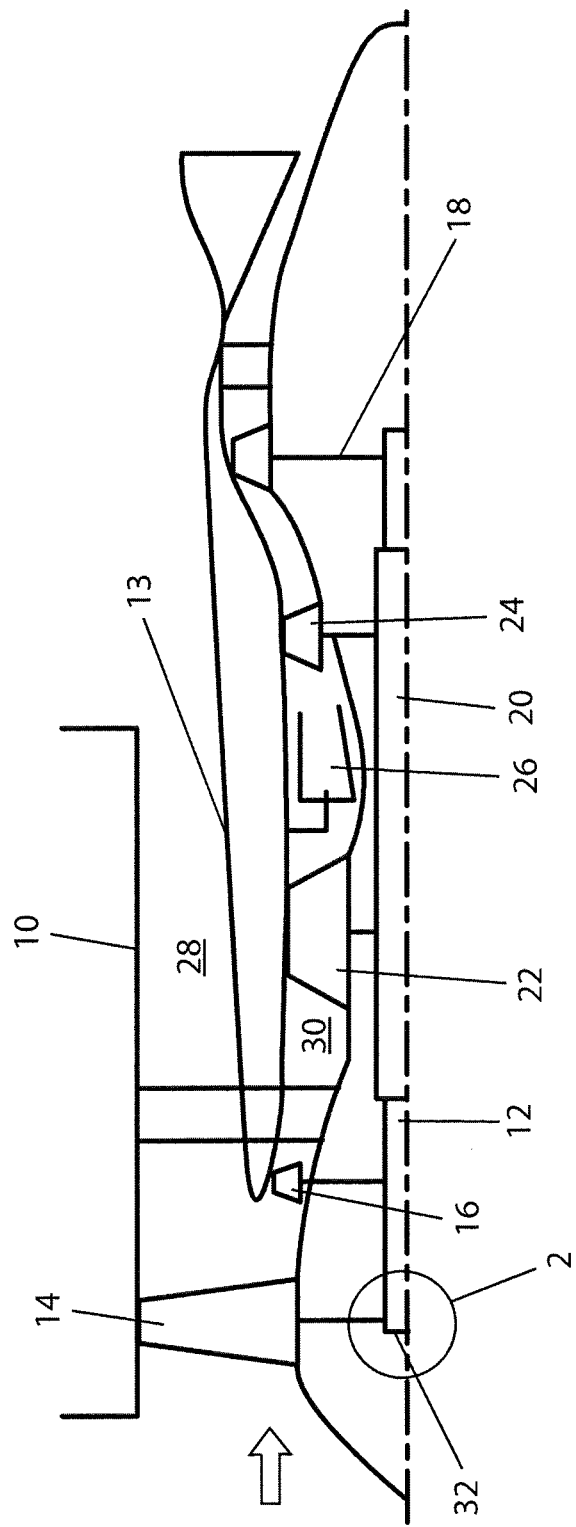
FIG. 1 is a schematic cross-sectional view of a turbofan gas turbine engine showing one embodiment of the described subject matter.

FIG. 1 illustrates a turbofan gas turbine engine according to one embodiment. The engine includes a housing or nacelle 10, a core casing 13, a low pressure spool assembly (not numbered) which includes a fan rotor 14, a low pressure compressor assembly having a low pressure compressor 16 and a low pressure turbine assembly 18 connected by a shaft 12, and a high pressure spool assembly (not numbered) which includes a high pressure compressor assembly 22 and a high pressure turbine assembly 24 connected by a turbine shaft 20. The housing or nacelle 10 surrounds the core casing 13 and in combination the housing 10 and the core casing 13 define an annular bypass duct 28 for directing a bypass airflow. The core casing 13 surrounds the low and high pressure spool assemblies to define a core fluid path 30 therethrough. In the core fluid path 30 there is provided a combustor 26 to form a combustion gas generator assembly to generate combustion gases to power the high pressure turbine assembly 24 and the low pressure turbine assembly 20.

The terms "upstream" and "downstream" mentioned in the description below, generally refer to the airflow direction through the engine and are indicated by an arrow in FIG. 1. The terms "axial", "radial" and "circumferential" used for various components below are defined with respect to the main engine axis shown but not numbered in FIG. 1.

Figure 2:
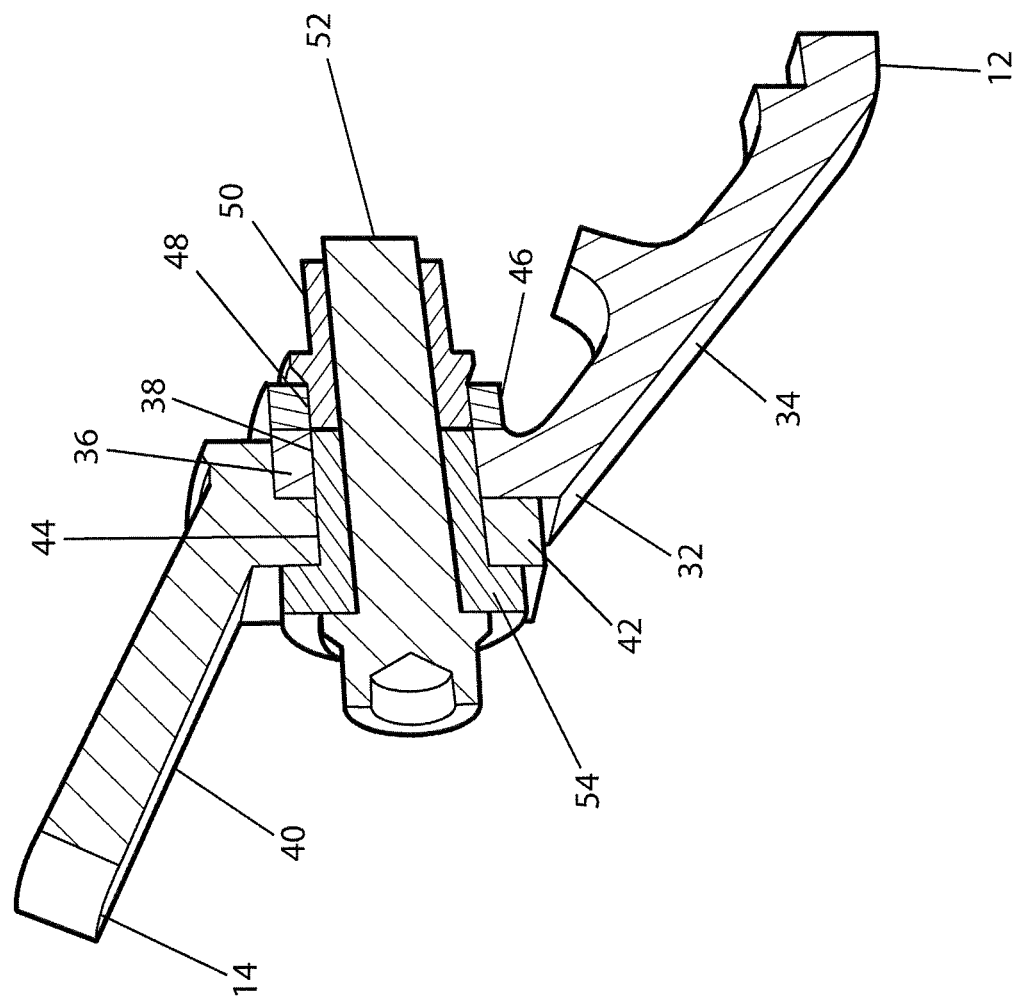
FIG. 2 is a partial perspective view of the circled area 2 of FIG. 1 in an enlarged scale, showing a cross-section of a structural arrangement of one embodiment.
Figure 3:
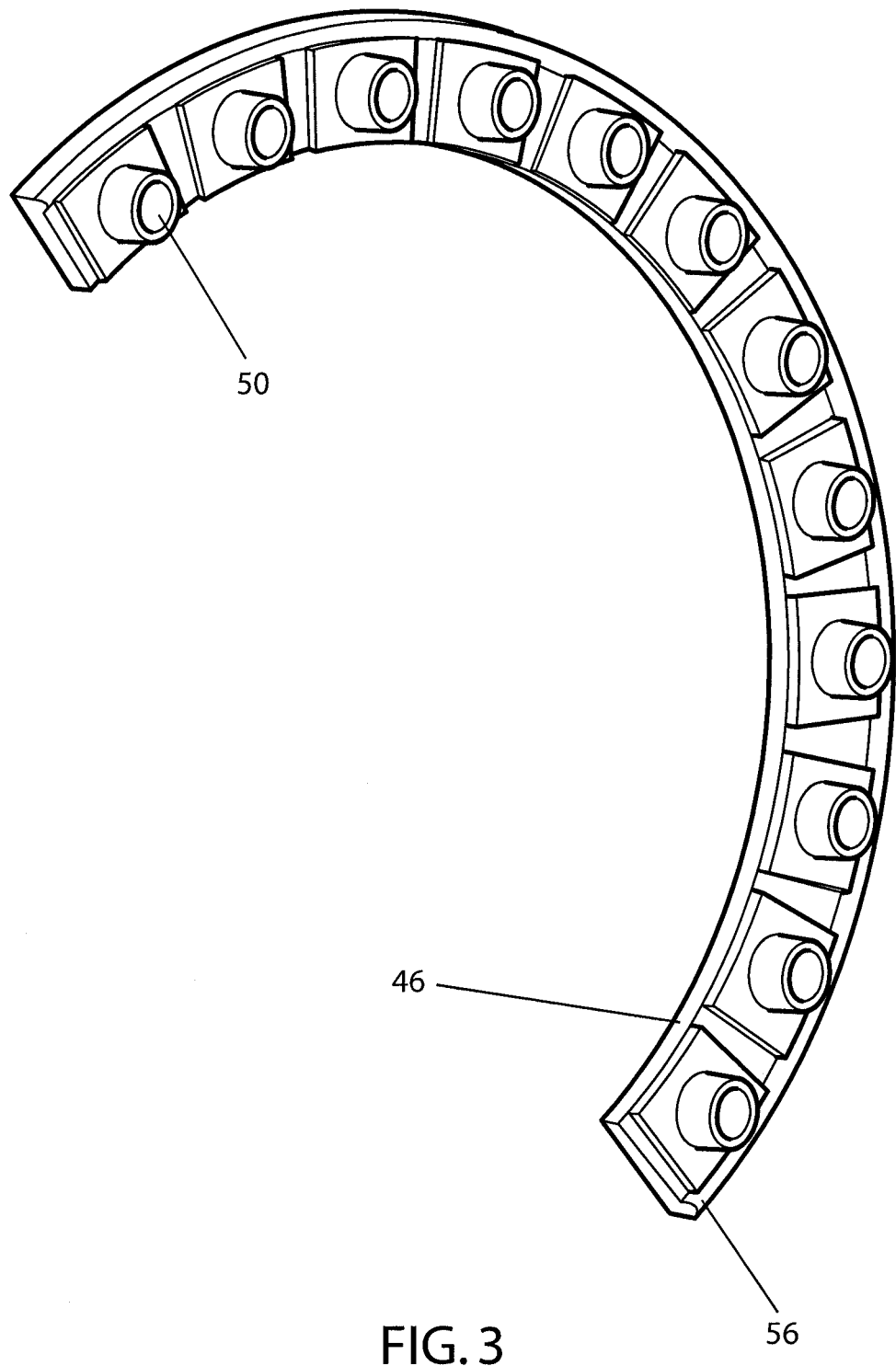
FIG. 3 is a perspective view of a circumferential segment of a clinch nut plate in a ring form used in the embodiment of FIG. 2.

According to one embodiment illustrated in FIG. 1-3, the shaft 12 is supported by a bearing assembly (not shown) disposed around the shaft 12 adjacent to an upstream end 32 of the shaft 12. The shaft 12 may include an upstream end portion 34 having a horn profile, extending radially outwardly and forwardly from the shaft 12 and terminating at the upstream end 32. Therefore, the upstream end 32 of the shaft 12 has a diameter and a circumferential periphery larger than the remaining portion of the shaft 12. An annular mounting flange 36 may be integrated with the upstream end 32 of the shaft 12, extending radially outwardly from the upstream end 32. A plurality of mounting holes 38 may extend axially through the annular mounting flange 36 between two opposite flat surfaces (not numbered) of the flange 36, circumferentially spaced apart one from another.

The fan rotor 14 may include a mounting apparatus such as annular web 40 to support an annular mounting flange 42 extending radially and inwardly from a downstream end of the annular web 40. A plurality of mounting holes 44 may be drilled through the annular mounting flange 42, circumferentially spaced apart one from another.

According to one embodiment, a clinch nut plate 46 in a ring form, may be provided with a plurality of holes 48 drilled through the clinch nut plate 46. The holes 48 may be circumferentially spaced apart one from another. A plurality of clinch nuts 50 may be installed in the respective holes 48 of the clinch nut plate 46.

Clinch nuts are generally known to provide multiple threads in materials to thin to be extruded or tapped, such as sheet metal. A clinch nut is a solid nut with a knurled or smooth shank or with a pilot projecting from one end. The clinch nut shanks are inserted into pre-formed holes in a sheet metal or a plate and are spread, crimped, or rolled over, thus "clinching" them to the parent material. In this embodiment, the clinch nut plate 46 which is used as a clamping member to secure the fan rotor 14 to the upstream end 32 of the shaft 12, positions and holds the respective clinch nuts 50 in a circumferentially disposed pattern for convenience of alignment and for threaded engagement with a plurality of mounting bolts 52. The mounting bolts 52 extend radially through the respective mounting holes 44 in the mounting flange 42 and further through the respective holes 38 in the mounting flange 36 of the shaft 12 to thereby secure the fan rotor 14 to the shaft 12. According to one embodiment, a sleeve 54 may be provided upstream of each clinch nut 50, surrounding the mounting bolt 52, and together with that mounting bolt 52, may be received in one of the mounting holes 44 of the mounting flange 42 of the fan rotor 14 and in one of the mounting holes 38 of the mounting flange 36 of the shaft 12.

According to one embodiment, the clinch nut plate 46 may be segmented, including a plurality of circumferential segments such as two halves of a plate ring, one of which is shown but not numbered, in FIG. 3. Each segment of the clinch nut plate 46 may have a radial flat surface (not numbered) to abut on of the opposite radial surfaces of the mounting flange 36. Each segment of the clinch nut plate 46 may also include at least one ridge 56 projecting outwardly from a radial surface (not numbered) opposite to said radial surface abutting the mounting flange 36. The at least one ridge 56 may be disposed adjacent to the respective clinch nuts 50, for example along the radial outer periphery of each segment, to prevent the respective clinch nuts 50 from rotation together with the respective mounting bolts 52 when the mounting bolts 52 are tightened.

According to one embodiment, a procedure for connecting the fan rotor 14 to the shaft 12 may be performed by providing such a clinch nut plate 46 and by inserting the mounting bolts 52, optionally with the sleeves 54 attached thereto, through the respective holes 44 in the mounting flange 42 of the fan rotor 14 and further through the holes 38 in the mounting flange 36 in the shaft 12, to threadedly engage with the respective clinch nuts 50 on the respective segments of the clinch nut plate 46 in order to clamp the flange 36 of the shaft 12 between the mounting flange 42 of the fan rotor 14 and the clinch nut plate 46. The circumferential segments of the clinch nut plate 46 may be attached to the mounting flange 36 of the shaft 12 in a loose condition of the threaded engagement of the mounting bolts 52 with the clinch nuts 50 in order to allow each of the circumferential segments of the clinch nut plate 46 to be disposed in a best position independent one from another, to thereby accommodate a mounting bolt pattern misalignment with respect to the pre-installed clinch nuts 50 on the clinch nut plate 46. The mounting bolts 52 are then tightened with respect to the respective engaged clinch nuts 50 in order to clamp the mounting flange 36 of the shaft 12 between the mounting flange 42 of the fan rotor 14 and the clinch nut plate 46. Due to the segmented configuration of the clinch nut plate 46, which accommodates bolt pattern misalignment with respect to the distribution pattern of the pre-installed clinch nuts 50, the mounting bolts 52 substantially bear clamping loads and avoid or significantly reduce shear loads which could react on the mounting bolts 52 if the bolt misalignment had not been accommodated.

The step of tightening the threaded engagement of the mounting bolts 52 with the respective clinch nuts 50 may be begin only after loose attachment of all the segments of the clinch nut plate 46 to the mounting flange 36 of the shaft 12 is completed, which may better accommodate the mounting bolt pattern misalignment with respect to the clinch nut distribution pattern.

Alternatively, the segmented clinch nut plate 46 may include three or more circumferential plate segments.

The above description is meant to be exemplary only, and one skilled in the art will recognize that changes may be made to the embodiments described without departure from the scope of the described subject matter. For example, the turbofan gas turbine as illustrated in FIG. 1, is an exemplary application of the described subject matter and the described subject matter may also be applicable to other types of engines. The fan rotor may have a mounting apparatus for receiving the mounting bolts other than the annular web supporting an annular flange, as described. The engine shaft may also have a mounting device integrated or removably connected thereto, such as a plurality of radial legs for receiving mounting bolts rather than the horn-profiled upstream end portion supporting a radial annular flange, as described. The clinch nuts may also be configured differently from those illustrated in the drawings. Still other modifications which fall within the scope of the described subject matter will be apparent to those skilled in the art, in light of a review of this disclosure, and such modifications are intended to fall within the appended claims.

The invention claimed is:

1. A gas turbine engine having at least one spool assembly including a fan rotor and a turbine rotor connected by a shaft, the at least one spool assembly further including a joint apparatus, the joint apparatus comprising a first mounting device of the fan rotor, and a second mounting device of the shaft and a clinch nut plate in a form of a ring, the second mounting device of the shaft defining a plurality of mounting holes circumferentially spaced apart one from another, the clinch nut plate including a plurality of holes circumferentially spaced apart one from another and a plurality of clinch nuts installed in the respective holes in the clinch nut plate, a plurality of mounting bolts axially extending through respective mounting holes of the first mounting device of the fan rotor and further passing through the mounting holes in the second mounting device of the shaft, the mounting bolts threadingly engaging the respective clinch nuts to clamp the second mounting device of the shaft between the first mounting device of the fan rotor and the clinch nut plate, the clinch nut plate including a plurality of circumferential segments physically separate one from another.

2. The gas turbine engine as defined in claim 1 wherein the second mounting device of the shaft comprises an annular flange extending radially outwardly from an upstream end of the shaft.

3. The gas turbine engine as defined in claim 2 wherein the first mounting device of the fan rotor comprises an annular fan rotor flange extending radially inwardly from the fan rotor, the annular fan rotor flange defining said mounting holes of the first mounting device.

4. The gas turbine engine as defined in claim 2 wherein the clinch nut plate comprises a radial flat surface of each of the segments, abutting a radial surface of the mounting flange of the shaft.

5. The gas turbine engine as defined in claim 4 wherein each segment of the clinch nut plate comprises at least one ridge projecting outwardly from a radial surface opposite to the radial surface abutting the mounting flange, the at least one ridge being disposed adjacent to the clinch nuts in each segment to prevent the respective clinch nuts from rotation.

6. The gas turbine engine as defined in claim 1 wherein the segmented clinch nut plate comprises two circumferential segments, each segment being substantially a half of the ring form.

7. The gas turbine engine as defined in claim 1 wherein the apparatus comprises a plurality of sleeves disposed upstream of the respective clinch nuts, each of the sleeves surrounding one of the mounting bolts and being received in one the mounting holes of the first mounting device of the fan rotor and in one of mounting holes in the second mounting device of the shaft.

8. A method for connecting a fan rotor to a shaft of a gas turbine engine, the method comprising:
a) providing a clinch nut plate in a ring form including a plurality of holes circumferentially spaced apart one from another and a plurality of clinch nuts installed in the respective holes in the clinch nut plate, the clinch nut plate including two or more separate circumferential segments; and
b) inserting a plurality of mounting bolts through respective holes in a first mounting device of the fan rotor and holes of a second mounting device of the shaft to threadingly engage with the respective clinch nuts of the segments of the clinch nut plate in order to clamp the second mounting device of the shaft between the first mounting device of the fan rotor and the clinch nut plate, the segments of the clinch nut plate being disposed separately one from another to reduce shear loads acting on the mounting bolts.

9. The method as defined in claim 8 wherein step (b) is performed by attaching the segments of the clinch nut plate to the second mounting device of the shaft, and then tightening the threaded engagement of the mounting bolts with the respective clinch nuts.

10. The method as defined in claim 9 wherein the step of tightening the threaded engagement of the mounting bolts with the respective clinch nuts begins only after attachment of all the segments of the clinch nut plate to the second mounting device of the shaft is completed.

\* \* \* \* \*